(12) United States Patent
Wellershoff

(10) Patent No.: US 8,950,124 B2
(45) Date of Patent: Feb. 10, 2015

(54) CABLE END ANCHORAGE WITH OVERLOAD PROTECTION

(75) Inventor: Frank Wellershoff, Würzburg (DE)

(73) Assignee: Josef Gartner GmbH (DE)

( * ) Notice: Subject to any disclaimer, the term of this patent is extended or adjusted under 35 U.S.C. 154(b) by 489 days.

(21) Appl. No.: 12/828,395

(22) Filed: Jul. 1, 2010

(65) Prior Publication Data

US 2011/0000155 A1 Jan. 6, 2011

(30) Foreign Application Priority Data

Jul. 2, 2009 (DE) .......................... 10 2009 033 032
Jun. 30, 2010 (EP) ..................................... 10167919

(51) Int. Cl.
*E04B 1/00* (2006.01)
*E04B 2/88* (2006.01)
*F16G 11/06* (2006.01)
*E04B 1/98* (2006.01)

(52) U.S. Cl.
CPC ................ *E04B 2/885* (2013.01); *F16G 11/06* (2013.01); *E04B 1/98* (2013.01); *Y10S 248/909* (2013.01)
USPC .................. 52/98; 52/223.13; 403/2; 403/41; 248/548; 248/909

(58) Field of Classification Search
USPC ................... 52/223.13, 98, 148, 223.14, 711; 248/548, 909; 403/2, 41, 165
See application file for complete search history.

(56) References Cited

U.S. PATENT DOCUMENTS 183,750 A * 10/1876 Clifford ............................ 59/95
518,213 A * 4/1894 Ball ............................. 174/185

(Continued)

FOREIGN PATENT DOCUMENTS

DE 2053832 A1 11/1972
EP 0 508 840 A1 10/1992

(Continued)

OTHER PUBLICATIONS

European Search Report dated Nov. 9, 2010.

*Primary Examiner* — James Ference
(74) *Attorney, Agent, or Firm* — Quarles & Brady LLP

(57) ABSTRACT

A cable end anchorage for fastening at least one cable at a supporting structure includes at least one first connecting element for connection with the supporting structure, at least one second connecting element for connection with the cable and at least one coupling element for connection of the two connecting elements in a force-transmitting manner. In the region of the coupling element, an overload device designed as a predetermined breaking point of the coupling element is provided for unfastening the connection between the two connecting elements when a critical load has been exceeded. A stop device is provided for limiting the relative motion of the connecting elements after unfastening of the connection when a critical load has been exceeded. The cable end anchorage features a transverse plate that is connected with the coupling element in a force-transmitting manner and at least one tension rod that penetrates the transverse plate in a recess with an at least slightly radial clearance, wherein one end of the tension rod is connected with one of the two connecting elements in a force-transmitting manner on one side of the transverse plate, and a terminal plate is provided at the opposite end of the tension rod on the other side of the transverse plate, the terminal plate serving as a stop on the transverse plate when a critical load has been exceeded.

15 Claims, 2 Drawing Sheets

(56) References Cited

U.S. PATENT DOCUMENTS

| | | | | |
|---|---|---|---|---|
| 1,113,256 | A * | 10/1914 | Smith | 59/95 |
| 1,471,105 | A * | 10/1923 | Cox | 403/164 |
| 1,698,162 | A * | 1/1929 | Lynch | 403/164 |
| 1,786,081 | A * | 12/1930 | Nourse | 403/165 |
| 2,032,764 | A * | 3/1936 | Otte | 59/95 |
| 2,060,593 | A * | 11/1936 | Schaurte et al. | 470/11 |
| 2,083,054 | A * | 6/1937 | Cline | 285/2 |
| 2,105,178 | A * | 1/1938 | Berndt | 403/302 |
| 2,246,588 | A * | 6/1941 | Harrall | 384/619 |
| 2,651,533 | A * | 9/1953 | Miller | 403/164 |
| 2,665,128 | A * | 1/1954 | Guffey | 267/71 |
| 2,693,980 | A * | 11/1954 | Heidman, Jr. | 294/82.28 |
| 2,889,162 | A * | 6/1959 | Norris | 403/2 |
| 3,049,194 | A * | 8/1962 | Brendel | 52/1 |
| 3,185,413 | A * | 5/1965 | Walker | 244/63 |
| 3,346,284 | A * | 10/1967 | Petersen et al. | 403/78 |
| 3,504,460 | A * | 4/1970 | Solberg | 52/98 |
| 3,836,268 | A * | 9/1974 | Behnke | 403/165 |
| 3,866,367 | A * | 2/1975 | Strizki | 52/98 |
| 3,922,104 | A * | 11/1975 | McCullough | 403/2 |
| 4,017,198 | A * | 4/1977 | Mason | 403/43 |
| 4,074,519 | A * | 2/1978 | Garrett | 59/95 |
| 4,308,419 | A * | 12/1981 | Fredriksson | 174/185 |
| 4,330,926 | A * | 5/1982 | McCall | 29/525.01 |
| 4,337,852 | A * | 7/1982 | Flory | 188/375 |
| 4,337,923 | A * | 7/1982 | Smith | 254/134.3 FT |
| 4,630,412 | A | 12/1986 | Engstrom et al. | |
| 4,995,583 | A * | 2/1991 | De La Fuente | 248/636 |
| 5,112,075 | A * | 5/1992 | Tomse | 280/503 |
| D326,601 | S * | 6/1992 | Smith | D8/356 |
| 5,122,007 | A * | 6/1992 | Smith | 403/2 |
| 5,281,041 | A * | 1/1994 | Yeh | 403/60 |
| D346,423 | S * | 4/1994 | Kitagawa | D22/134 |
| 5,399,042 | A * | 3/1995 | Ivel | 403/165 |
| 5,466,082 | A * | 11/1995 | Sherar | 403/2 |
| 5,599,129 | A * | 2/1997 | Clifton et al. | 403/2 |
| 5,997,097 | A * | 12/1999 | Engelhard | 297/472 |
| 6,007,267 | A * | 12/1999 | VanHorn | 403/2 |
| 6,245,991 | B1 * | 6/2001 | Ryan | 174/40 TD |
| 6,382,583 | B1 * | 5/2002 | Hill et al. | 248/548 |
| 6,488,434 | B1 * | 12/2002 | Graeff | 403/2 |
| 7,080,572 | B2 * | 7/2006 | Blendea | 74/502.6 |
| 7,146,922 | B1 * | 12/2006 | Morton | 114/253 |
| 8,051,615 | B2 * | 11/2011 | Mathews et al. | 52/223.13 |
| 2003/0019999 | A1 * | 1/2003 | Hill et al. | 248/548 |

FOREIGN PATENT DOCUMENTS

| | | |
|---|---|---|
| FR | 2536144 A1 | 5/1984 |
| FR | 2 673 253 A1 | 8/1992 |
| WO | 84/04773 | 12/1984 |

* cited by examiner

CABLE END ANCHORAGE WITH OVERLOAD PROTECTION

This application claims priority to German Patent Application No. 10 2009 033 032.1, filed Jul. 2, 2009, and European Patent Application No. 10 167 919.9 filed Jun. 30, 2010, both of which are fully incorporated herein by reference.

STATEMENT CONCERNING FEDERALLY SPONSORED RESEARCH OR DEVELOPMENT

Not Applicable.

FIELD OF THE INVENTION

The present invention relates to a cable end anchorage for fastening at least one cable at a supporting structure, with at least one first connecting element for connection with the supporting structure, at least one second connecting element for connection with the cable and at least one coupling element for connection of the two connecting elements in a force-transmitting manner.

BACKGROUND OF THE INVENTION

In particular in structural engineering, here in turn especially in facade engineering, tension cable elements are frequently employed. In this context, tension cable elements feature a cable and cable end anchorages with the aid of which the cable can be fastened for instance at the supporting structure or else the carrying structure of a building. Then, facade elements, such as glass panels, plastic panels or metal panels can be secured onto the tension cable elements.

Conventionally, such a cable construction is dimensioned and configured in such a manner that the resistance of the tension cable elements is higher than the maximum stresses to be expected, for instance as a result of wind loads, thermal loads, dead loads, pre-loads etc. in addition to relevant security factors. In order to limit deformations of the cables and the facade upon exposure to ordinary stresses, extremely robustly configured cable elements exhibiting large preload forces and breaking forces are utilized. Upon exposure to extraordinary stresses, for instance as a result of vehicle collision or explosion shock waves, high loads are transmitted to the supporting structure, so that the supporting structures are required to be statically configured so as to withstand such extraordinarily high stresses, in order to therefore prevent destruction of the main building supporting structure and hence destruction of the building per se. This aspect gives rise to high constructional complexity and increased costs.

Moreover, for instance from Document DE 2 053 832 A an element having a predetermined breaking point is known which has a determinate number of bars arranged between two connecting elements. The bars are configured in such a manner that two or more bars break at a predetermined point when a preset tensile force has been exceeded, whereby the released cable end is captured by the unbroken bars.

SUMMARY OF THE INVENTION

Starting from this state of the art, it is an object of the present invention to realize cable constructions, particularly for facade construction, that feature a high degree of inherent rigidity and resistance and, on the other hand, reliably decouple the supporting structure from the maximum loads destroying the same.

This object is attained by a cable end anchorage according to the teaching of claim 1.

Advantageous embodiments are the subject-matter of the subclaims.

The inventive cable end anchorage for fastening at least one cable at a supporting structure in a known manner firstly features at least one first connecting element for connection with the supporting structure, at least one second connecting element for connection with the cable and at least one coupling element for connection of the two connecting elements in a force-transmitting manner. In this context, in the region of the coupling element provision is made for an overload device formed as a predetermined breaking point for unfastening the connection between the two connecting elements when a critical load has been exceeded. Moreover, provision is made for a stop device limiting the relative motion of the connecting elements after unfastening of the connection when the critical load has been exceeded.

According to the invention, the cable end anchorage features a transverse plate that is connected with the coupling element in a force-transmitting manner, for instance in a welded or integrally formed fashion, and at least one tension rod penetrating the transverse plate in a recess with at least slight radial clearance. One end of the tension rod in this context is connected with one of the two connecting elements in a force-transmitting manner on one side of the transverse plate, for instance in a welded or integrally formed fashion. At the opposite end of the tension rod, on the other side of the transverse plate provision is made for a terminal plate that serves as a stop on the transverse plate when the critical load has been exceeded. In this context, preferably at least two such tension rods are provided.

In contrast to the known cable end anchorages that establish a rigid connection between the cable and the supporting structure until either the cable construction as a whole collapses or else until the supporting structure is destroyed upon exposure to maximum stresses, for instance due to an explosion shock wave, according to the present invention provision is made for an overload device for unfastening the connection between the two connecting elements when a critical load has been exceeded. In other words, this means that with the aid of the overload device, the tension cable element is unfastened from the supporting structure when a precisely defined load has been exceeded, resulting in the maximum load acting upon the supporting structure being minimized, so that the supporting structure as a whole can be configured so as to withstand a reduced amount of stress.

Due to this inventive design, in addition, the entire tension cable element is extended when the overload protection is activated, whereby the preload force is decreased and the aeroelastic damping of the air mass at the back of the facade is increased. As a consequence, the stresses exerted upon the facade elements, especially the glass panes and the glass pane retainers, are reduced, so that the glass panes, primarily constituting composite glass panes, either do not break or else the pieces of glass at least experience reduced acceleration, so that the trajectory of the pieces of glass is reduced and damage at the back of the facade is minimized.

The formation of the predetermined breaking point of the coupling element can be performed for instance by deliberately weakening the cross-section of the coupling element, in particular in the form of an annular groove.

In order to prevent in particular damage to or injury of persons located in the interior of a building that is furnished with such a cable facade construction, according to the invention, the tension cable element can be retained by the stop device again in a state of residual load-bearing capacity in a controlled manner when the overload protection has been activated. In other words, this means that after activation of the overload protection by extension of the tension cable element, in fact, the tension can be abruptly dissipated while a residual load-bearing capacity is retained that prevents collapse of the facade construction as a whole and at the same time prevents potential intrusion of facade parts into the interior of the building.

The coupling element, in the simplest case, may be formed as a tension rod, cable or tension plate or else as a tension rod, tension plate or cable arrangement with several tension elements.

In order to reduce the forces acting upon the stop device in response to the strongly accelerated cable ends after activation of the overload protection, according to another exemplary embodiment of the invention, provision is made for a spring and/or damper device, absorbing the stresses acting upon the stop device after unfastening of the connection when a critical load has been exceeded. In this connection, the spring and/or damper device may optionally feature elastic elements, particularly in the form of a coil spring, disk spring, stack of disk springs or elastomer spring, or elasto-plastic elements, in particular in the form of a plastic buffer, or plastically deformable elements, in particular made of aluminum foam, aluminum honeycomb material, aluminum beads, porous concrete or light-weight concrete or similar.

In the previously described exemplary embodiment, the elastically, elasto-plastically and/or plastically deformable elements can be arranged between the transverse plate and the terminal plate and can be penetrated by the tension rod.

According to another preferred exemplary embodiment of the invention, provision is made for at least two tension rods, wherein each tension rod penetrates either a separate spring and/or damper device or the tension rods penetrate a shared spring and/or damper device.

Preferably, in this process, the tension rods and/or the spring devices and/or damper devices are symmetrically arranged with respect to the longitudinal axis extending through the coupling element, whereby an overall symmetrical load distribution is obtained.

In a basically optional manner, the spring and/or damper device can be substantially made of a homogenous and/or integrally formed spring element and/or damper element. However, according to another exemplary embodiment, the spring and/or damper device features a determinate number of consecutively arranged spring elements and/or damper elements with respect to the direction of load, which are separated by interposed intermediate plates. These intermediate plates, which are preferably composed of a solid material, for instance steel, thereby serve the purpose of introducing forces in a defined manner into the respective spring elements and/or damper elements.

In order to prevent parts of the load from being introduced into the spring device and/or damper device prior to complete breakage of the predetermined braking point, according to another embodiment, at least one intermediate layer composed of a material with low stability, for instance in the form of a silicone plate can be provided between the transverse plate and the spring device and/or damper device, between the terminal plate and the spring device and/or damper device and/or between the spring elements and/or damper elements of the spring device and/or damper device.

According to another exemplary embodiment of the invention, provision is additionally made for a follower plate disposed at the tension rod between the end of the tension rod, which is connected with the connecting element, and the transverse plate, wherein between the follower plate and the transverse plate, elastically, elasto-plastically and/or plastically deformable elements are arranged and can be penetrated by the tension rod. In this context, the follower plate serves as a stop when the cable experiences a backlash into a direction opposite to the direction of movement after activation of the overload device, wherein the forces acting upon the stop device in turn can be elastically, elasto-plastically and/or plastically absorbed.

Preferably, the tension rod or the tension rods are provided with a thread at least in sections. By means of this measure, the plastically, elasto-plastically and/or plastically deformable elements can be readily braced between the terminal plate and the transverse plate or the follower plate and the transverse plate with the aid of a clamping nut by a predetermined amount.

The inventive coupling of a tension cable element with a supporting structure can be employed in a basically arbitrary fashion likewise for coupling two tension cable elements. Moreover, a tension cable element within the scope of the invention may feature one or more tension cables that can be arranged in parallel to one another or else angularly with respect to one another. In this regard, each tension cable may be assigned a separate coupling member or else two or more tension cables may be fastened at one coupling member. In basically the same manner, each tension cable and/or each coupling member may be assigned a separate spring device and/or damper device or the tension cables and/or the coupling elements are each coupled via a shared spring device and/or damper device.

BRIEF DESCRIPTION OF THE DRAWINGS

In the following, the invention will be explained in greater detail with reference to the drawings illustrating only exemplary embodiments.

In the drawings.

DETAILED DESCRIPTION OF THE PREFERRED EMBODIMENT

Figure 1:
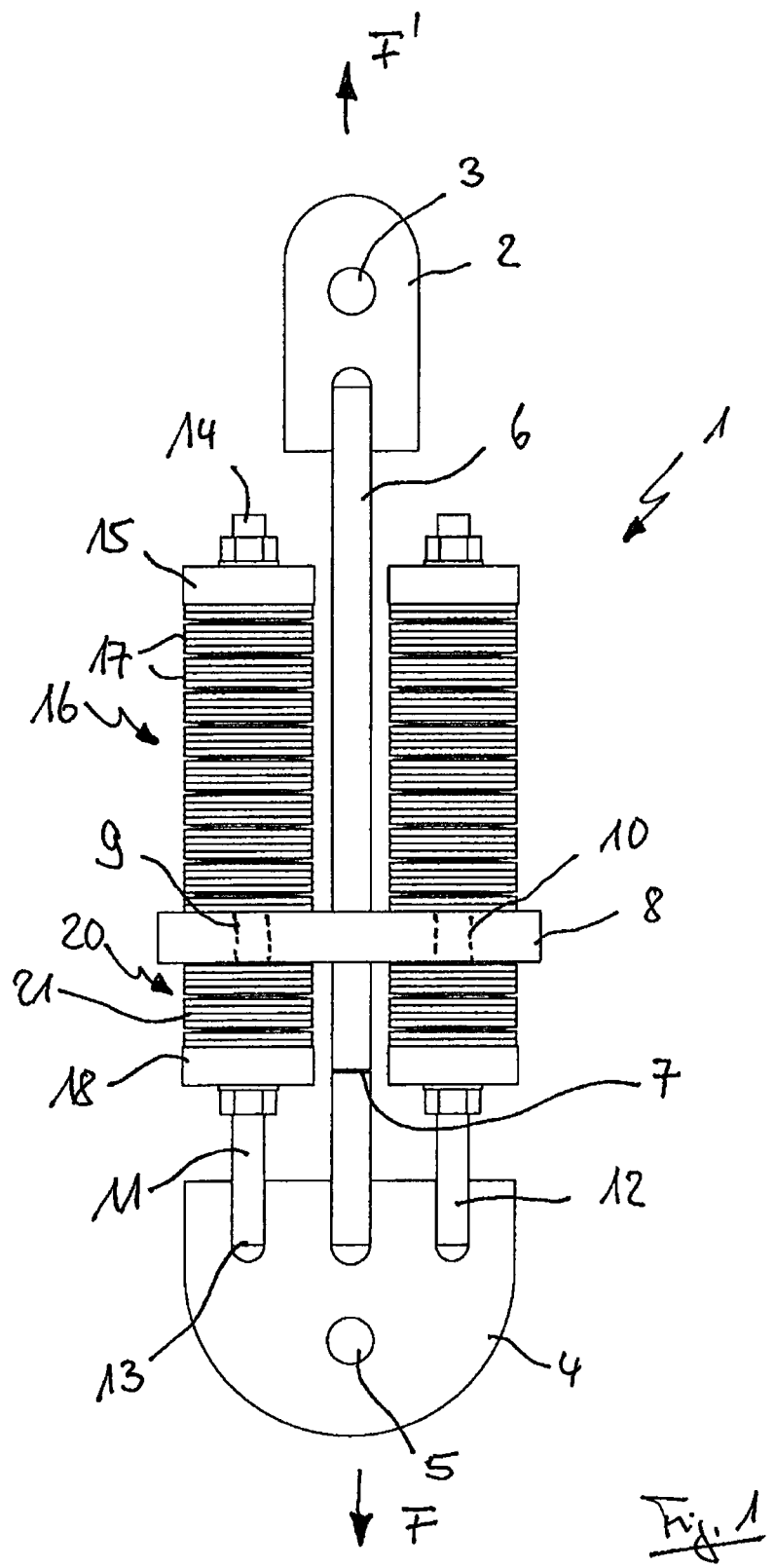
FIG. 1 schematically illustrates a first exemplary embodiment of an inventive cable end anchorage in a frontal view.

FIG. 1 illustrates a first exemplary embodiment of an inventive cable end anchorage 1. The cable end anchorage here features a first connecting element 2 in the form of a fastening plate. The fastening plate is equipped with a recess 3 for penetration of a fastening bolt (not shown) for fastening at a supporting structure (not shown). Moreover, the cable end anchorage features a second connecting element 4 equally in the form of a fastening plate with a recess 5 functionally corresponding to the recess 3. Via the recess, the end of a steel cable equipped with a corresponding fitting can be coupled with the aid of a stud bolt or the like.

The two connecting elements 2 and 4 are connected with one another in a force-transmitting manner via a bar-shaped coupling element 6, i.e. firstly in a substantially rigid fashion. When a tensile force is exerted in the direction of arrow F, in this process, the load applied at the cable is transmitted to the supporting structure.

The coupling element 6 features an overload device 7 in the form of an annular groove surrounding the coupling element. This annular groove causes weakening of the cross-section of the bar-shaped coupling element and therefore constitutes a predetermined breaking point that causes the coupling element 6 to collapse or to break when a maximum load has been exceeded. As a consequence, the rigid connection between the two connecting elements 2 and 4 and therefore likewise between the supporting structure and the tension cable element is unfastened. While the connecting element 2 remains at the supporting structure in a substantially immobile fashion the connecting element 4 moves into the direction indicated by arrow F in response to the tensile load exerted by the cable. In this process, the load acting upon the supporting structure is abruptly dissipated and the supporting structure is therefore protected against overload and destruction.

In order to capture the released cable end and to limit the motion of the cable end and thereby the motion of the connecting element 4, in the exemplary embodiment according to FIG. 1 provision is made for a stop device. This stop device features a transverse plate 8. This transverse plate 8, with respect to the connecting element 4, is fastened above the same in a force-transmitting manner, here in a welded fashion, to the coupling element 6. The transverse plate 8 features two merely schematically illustrated continuous recesses 9 and 10 that are penetrated by two tension rods 11 and 12 with radial clearance. Since the two tension rods 11 and 12 are formed so as to be identical, in the following, the design will be described merely by means of the example of tension rod 11. Tension rod 11 with its first end 13 is fastened at the connecting element, here in a welded fashion. With its second free end 14, respectively the pole thereof, the tension rod penetrates the recess 9. In the region of the second end 14 that is provided with a thread, a terminal plate 15 is provided on the tension rod 11. This terminal plate is equally penetrated by the tension rod with radial clearance and is secured by the clamping nut that is screwed onto the thread of the tension rod.

Between the terminal plate 15 and the transverse plate 8, a spring element and/or a damper element 16 is arranged in the form of a stack of disk springs 17. The pole of the tension rod 11 passes through the disc springs. By means of tightening or loosening of the clamping nut, the preload of the stack of disk springs 16, 17 can be preset in a simple manner.

Underneath the transverse plate 8, a follower plate 18 is arranged on the tension rod 11, the follower plate being equally penetrated by the tension rod with radial clearance. This follower plate 18 is also secured via a second clamping nut 19 that is screwed onto the tension rod. In a similar manner as described above, a second spring element and/or damper element 20 composed of a stack of disk springs 21 is arranged between the transverse plate 8 and the follower plate 18. In this case too, the stack of disk springs can be braced by the clamping nut 19 by a desired amount.

If the predetermined breaking point breaks at the tension cable element when a critical maximum load has been exceeded, the released cable end and therefore the connecting element 4 are accelerated into the direction indicated by arrow F. In this process, via the tension rods 11 and 12 that are movable with respect to the transverse plate 8, the terminal plates are simultaneously accelerated and therefore brace the stack of disk springs 16. In this process, in addition to abrupt relief, the released energy is buffered in an elastic manner, whereby the free cable end is also captured. A backlash caused in response to the elastic restoring force of the stack of disk springs 16 and in particular of the tension cable element as a whole is absorbed by the follower plate 18, the stack of disk springs 20 and the transverse plate 8.

Figures 2, 3:
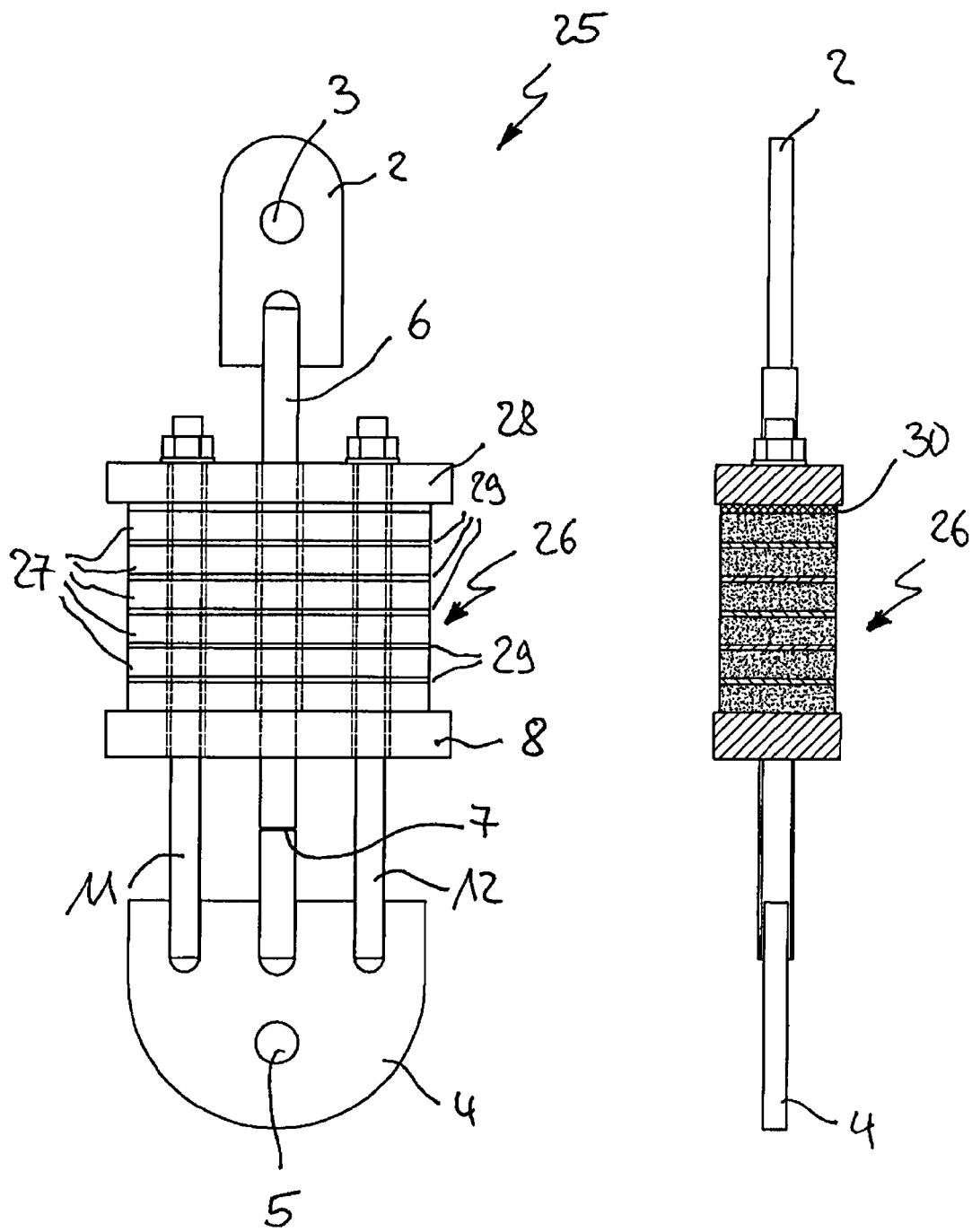
FIG. 2 illustrates a view of a second exemplary embodiment according to the invention corresponding to FIG. 1.
FIG. 3 illustrates the exemplary embodiment according to FIG. 2 in a partially fractured lateral view rotated by 90°.

The exemplary embodiment illustrated in FIG. 2 of an inventive cable end anchorage 25 firstly basically features the same configuration as the exemplary embodiment according to FIG. 1. While, however, in the exemplary embodiment according to FIG. 1 the spring device and/or damper device is formed by two stacks of disk springs 16 which are each penetrated by a tension rod 11 and 12, the spring device and/or damper device according to the exemplary embodiment of FIG. 2 is formed by a single stack 26 of plastically deformable elements 27 for instance of aluminum foam or light-weight concrete, which are arranged above one another in a stacked manner into the direction of load. The terminal plate 28 which is penetrated by the coupling element 6 with radial clearance, in contrast to the embodiment according the FIG. 1, wherein one terminal plate 15 is respectively provided for each tension rod, is integrally formed and simultaneously interacts with both tension rods 11 and 12.

The plastically deformable elements 27 are each separated by intermediate plates 29 made of a solid material, such as steel, to uniformly distribute the deformation forces.

Moreover, between the terminal plate 28 and the closest plastically deformable element 27, an intermediate layer 30 made of a material with low stability and solidity, such as silicone, is arranged. By means of this measure, it is prevented that during breakage of the predetermined breaking point 7, which is connected with an extension of the coupling element, the spring element and/or damper element 26 is already exposed to stresses, whereby the breaking characteristic of the predetermined breaking point may be unfavorably modified. Instead, a reliable functional separation between predetermined breaking point and capturing of the released stresses can be attained.

I claim:

1. A cable end anchorage for fastening at least one cable at a supporting structure, said anchorage comprising:
    at least one first connecting element for connection with the supporting structure;
    at least one second connecting element for connection with the cable;
    at least one coupling element connecting the first and second connecting elements in a force-transmitting manner, said at least one coupling element including a predetermined breaking point, said predetermined breaking point unfastening the connection between the two connecting elements when a critical load has been exceeded;
    a transverse plate connected with the at least one coupling element in a force-transmitting manner, said transverse plate being a stop device limiting relative motion of the connecting elements after unfastening of the connection when a critical load has been exceeded;
    at least one tension rod penetrating the transverse plate, wherein one end of the at least one tension rod is connected with one of the two connecting elements in a force-transmitting manner on one side of the transverse plate;
    a terminal plate provided at the opposite end of the tension rod on an opposing side of the transverse plate, the terminal plate serving as a stop on the transverse plate when a critical load has been exceeded, said at least one coupling element extending through said terminal plate with a radial clearance; and
    at least one of a spring and a damper device located between the terminal plate and the transverse plate and absorbing the loads acting upon the stop device after unfastening of the connection when the critical load has been exceeded.

2. The cable end anchorage according to claim 1, in which the at least one coupling element is formed as a tension rod, pull cable or tension plate.

3. The cable end anchorage according to claim 1, in which the at least one of a spring and damper device comprises at least one elastic element.

4. The cable end anchorage according to claim 3, in which the at least one elastic element is selected from a group consisting of a coil spring, a disk spring, a stack of disk springs and an elastomer spring.

5. The cable end anchorage according to claim 1, in which the at least one of a spring and damper device comprises at least one plastically deformable element.

6. The cable end anchorage according to claim 5, in which the at least one plastically deformable element is arranged between the transverse plate and the terminal plate and is penetrated by the tension rod.

7. The cable end anchorage according to claim 5, in which the at least one plastically deformable element is selected from a group consisting of aluminum foam, aluminum honeycomb material, aluminum beads, porous concrete and light-weight concrete.

8. The cable end anchorage according to claim 1 in which the at least one tension rod comprises at least two tension rods, wherein each of the tension rods penetrates a separate spring or damper device.

9. The cable end anchorage according to claim 8, in which at least one of the tension rods and the at least one of a spring and damper device is symmetrically arranged with respect to the longitudinal axis extending through the at least one coupling element.

10. The cable end anchorage according to claim 1 in which the at least one tension rod comprises at least two tension rods that penetrate the at least one of a spring and damper device.

11. The cable end anchorage according to claim 1, in which the at least one of a spring and damper device comprises a plurality of one of a spring and damper devices that are consecutively arranged in the direction of loading and that are separated by interposed intermediate plates.

12. The cable end anchorage according to claim 1, in which at least one intermediate layer composed of a material with low stability being arranged in a manner selected from a group consisting of between the transverse plate and the spring device or damper device, between the terminal plate and the at least one of a spring and damper device or between at least one of spring elements and damper elements of the at least one of a spring and damper device.

13. The cable end anchorage according to claim 1, in which a follower plate arranged at the at least one tension rod between the end of the tension rod, that is connected with the connecting element, and the transverse plate, wherein at least one of an elastically deformable element, and plastically deformable element is arranged between the follower plate and the transverse plate and are penetrated by the at least one tension rod.

14. The cable end anchorage according to claim 1, in which the at least one tension rod is provided with a thread at least in sections and the at least one of elastically deformable element, and plastically deformable elements can be braced between at least one of the terminal plate and the transverse plate and between the follower plate and the transverse plate with the aid of a clamping nut.

15. The cable end anchorage according to claim 1, in which said at least one of a spring and a damper device located between the terminal plate and the transverse plate is compressed to absorb the loads acting upon the stop device after unfastening of the connection when the critical load has been exceeded.

* * * * *